United States Patent
Eidenbenz et al.

(10) Patent No.: US 12,452,152 B2
(45) Date of Patent: Oct. 21, 2025

(54) METHOD FOR DETECTING SYSTEM PROBLEMS IN A DISTRIBUTED CONTROL SYSTEM AND A METHOD FOR ALLOCATING FOGLETS IN A FOG NETWORK

(71) Applicant: ABB Schweiz AG, Baden (CH)

(72) Inventors: Raphael Eidenbenz, Zürich (CH); Mallikarjun Kande, Solon, OH (US); Andrea Macauda, Genoa (IT); Alexandru Moga, Thalwil (CH); Robert Birke, Kilchberg (CH); Thanikesavan Sivanthi, Würenlingen (CH); David Kozhaya, Dietikon (CH); Ognjen Vukovic, Dietikon (CH)

(73) Assignee: ABB Schweiz AG, Baden (CH)

( * ) Notice: Subject to any disclaimer, the term of this patent is extended or adjusted under 35 U.S.C. 154(b) by 1124 days.

(21) Appl. No.: 17/356,640

(22) Filed: Jun. 24, 2021

(65) Prior Publication Data

US 2021/0406081 A1 Dec. 30, 2021

(30) Foreign Application Priority Data

Jun. 30, 2020 (EP) .................................... 20183249

(51) Int. Cl.
*G06F 9/50* (2006.01)
*G06F 11/30* (2006.01)
(Continued)

(52) U.S. Cl.
CPC .......... *H04L 43/08* (2013.01); *G06F 11/3006* (2013.01); *G06F 11/3051* (2013.01); *G06F 11/3409* (2013.01)

(58) Field of Classification Search
CPC . H04L 43/08; H04L 43/0876; H04L 43/0882; H04L 43/0888; H04L 43/0894; H04L 43/12
See application file for complete search history.

(56) References Cited

U.S. PATENT DOCUMENTS

| | | | |
|---|---|---|---|
| 9,619,315 B1 | 4/2017 | Brissette et al. | |
| 2004/0128587 A1 | 7/2004 | Kenchammana-Hosekote et al. | |

(Continued)

FOREIGN PATENT DOCUMENTS

| | | |
|---|---|---|
| CN | 1934538 A | 3/2007 |
| CN | 110178096 A | 8/2019 |

OTHER PUBLICATIONS

Extended European Search Report; Application No. 20183249.0; Completed: Nov. 24, 2020; Issued: Mar. 10, 2021; 12 Pages.

(Continued)

*Primary Examiner* — Kostas J Katsikis
(74) *Attorney, Agent, or Firm* — Whitmyer IP Group LLC

(57) ABSTRACT

A method for detecting system problems in a distributed control system including a plurality of computational devices is suggested. The method includes: —deploying one or more software agents on one or more devices of the system; —monitoring, via the one or more software agents, a system configuration and/or a system functionality; —detecting a problem in the monitored system configuration and/or a system functionality; —adding one or more new software agents and deploying the one or more new software agents on one or more devices of the system associated with the problem; —collecting data associated with the problem, via the added software agents.

12 Claims, 3 Drawing Sheets

(51) Int. Cl.
*G06F 11/34* (2006.01)
*H04L 43/08* (2022.01)

(56) References Cited

U.S. PATENT DOCUMENTS

| | | |
|---|---|---|
| 2010/0211829 A1 | 8/2010 | Ziskind et al. |
| 2012/0136993 A1* | 5/2012 | Gao .................... H04L 43/0876 |
| | | 709/224 |
| 2014/0204727 A1 | 7/2014 | Gu et al. |
| 2015/0301515 A1 | 10/2015 | Houm |
| 2018/0113750 A1 | 4/2018 | Yoon et al. |
| 2019/0052659 A1* | 2/2019 | Weingarten ............. H04L 67/34 |
| 2019/0104437 A1* | 4/2019 | Bartfai-Walcott .... H04W 28/06 |
| 2021/0232990 A1* | 7/2021 | Maunz ................. G02B 27/648 |

OTHER PUBLICATIONS

Partial European Search Report; Application No. 20183249.0; Completed: Nov. 24, 2020; Issued: Dec. 12, 2020; 12 Pages.
Chinese Office Action; Application No. 202110719022.3; Completed Feb. 8, 2025; 7 Pages.
Chinese Office Action; Application No. 2021107190223; Issued: Jun. 12, 2025; 2 Pages.

\* cited by examiner

METHOD FOR DETECTING SYSTEM PROBLEMS IN A DISTRIBUTED CONTROL SYSTEM AND A METHOD FOR ALLOCATING FOGLETS IN A FOG NETWORK

TECHNICAL FIELD

The present disclosure generally relates to distributed control systems, fog computing networks, and in particular, to managing fog applications in fog networks which are implemented on an automation system.

BACKGROUND

The emergence of the Internet of Things (IoT) is extending the availability of network computing and resources to a wide range of devices and systems that have previously been excluded from data networking environments. Devices that have been working separately from each other and have been programmed manually can now work together and interact with each other. Complex system includes a plurality of devices and work together as an automation system which reacts and interacts with its environment.

A goal of doing so is to enable higher levels of automation by enabling machines of various complexity and purposes to communicate without reliance on human intervention and/or interaction through manually programming of machines via interfaces. The majority of devices, sensors, and actuators (the "things") that will be network-enabled in this manner will typically be included in much larger systems providing new forms of automation. Industrial automation systems become "smarter" and fog computing may help to increase engineering efficiency.

Fog computing helps enable these larger systems by moving the computation, networking and storage capabilities of the centralized cloud closer to the machines and devices. Given the projected scale of such systems, the demand for fog node resources is expected to be high.

Previously available cloud solutions (e.g., computing and storage) have a number of drawbacks and limitations that preclude previously available cloud solutions from satisfying the performance demands of IoT applications. For example, previously available cloud solutions provide insufficient performance in the areas of: satisfying low latency thresholds; supporting for highly mobile endpoint devices; and providing real-time data analytics and decision making.

Fog computing networks (or fog networks or fog environments) are being developed as a solution to satisfy the performance demands of IoT applications. Fog networks provide computing and storage resources closer to the edge of networks, as opposed to the remote and centralized clustering of previously available cloud solutions. Endpoint client devices and near-user endpoint devices of fog networks are configured to collaboratively service client applications at the edge of a network close to the things seeking resources.

An industrial fog environment enables easy deployment of fog applications on spare resources of the networking and compute devices, so-called fog nodes, of an industrial automation system. To ensure that the application components, so-called foglets, have sufficient resources available to fulfill their functions, resources are reserved for them based on declared estimated resource usage model during hardware sizing. However, failure of devices or software components may lead to inefficacy of the fog network.

Accordingly, there is a need for a concept of monitoring the execution of fog applications across the fog network.

Allocation of applications in a fog network need to be calculated based on a model. Usually, application models are manually adapted if the fog network changes or if the application is used on the network for the first time. A fog network enables running distributed applications on the devices of the underlying automation system. One key feature of fog computing is that deployment, updating and removal of applications shall require minimal manual effort.

Accordingly, there is a need to improve allocation of applications and automation in fog networks.

SUMMARY

A method for detecting system problems in a distributed control system comprising a plurality of computational devices is suggested. The method comprises:—deploying one or more software agents on one or more devices of the system;—monitoring, via the one or more software agents, a system configuration and/or a system functionality;—detecting a problem in the monitored system configuration and/or a system functionality;—adding one or more new software agents and deploying the one or more new software agents on one or more devices of the system associated with the problem;—collecting data associated with the problem, via the added software agents.

A method for allocating foglets in a fog network is suggested, wherein the fog network is implemented on a distributed control system comprising a plurality of devices. The method comprises:—providing a distributed control system comprising a plurality of devices, wherein one or more devices provide computational capacities;—providing a fog network with a plurality of fog nodes implemented on the system;—providing a first set of foglets including at least one foglet;—allocating the first set of foglets to one or more fog nodes, wherein the allocation is based on a predetermined set of rules for allocation of foglets;—monitoring key performance indicators of an execution of the first set of foglets;—automatically creating or updating a dynamic set of rules for allocation of foglets based on the allocation of the first set of foglets and the monitored key performance indicators;—providing a second set of foglets including at least one foglet and allocating the second set of foglets to one or more fog nodes, wherein the allocation is based on the predetermined set of rules for allocation of foglets and the dynamic set of rules for allocation of foglets, or moving the execution of at least one foglet of the first set of foglets from one fog node to another fog node of the plurality of fog nodes based on the predetermined set of rules for allocation of foglets and the dynamic set of rules for allocation of foglets.

Those skilled in the art will recognise additional features and advantages upon reading the following detailed description, and upon viewing the accompanying drawing.

DETAILED DESCRIPTION

In the following detailed description, reference is made to the accompanying drawings, which form a part hereof, and in which are shown by way of illustration specific embodiments of the invention.

As used herein, the terms "having", "containing", "including", "comprising" and the like are open ended terms that indicate the presence of stated elements or features, but do not preclude additional elements or features.

It is to be understood that other embodiments may be utilised, and structural or logical changes may be made without departing from the scope of the present invention. The following detailed description, therefore, is not to be taken in a limiting sense, and the scope of the present invention is defined by the appended claims. The embodiments described herein use specific language, which should not be construed as limiting the scope of the appended claims. Each embodiment and each aspect so defined may be combined with any other embodiment or with any other aspect unless clearly indicated to the contrary.

Figure 1:
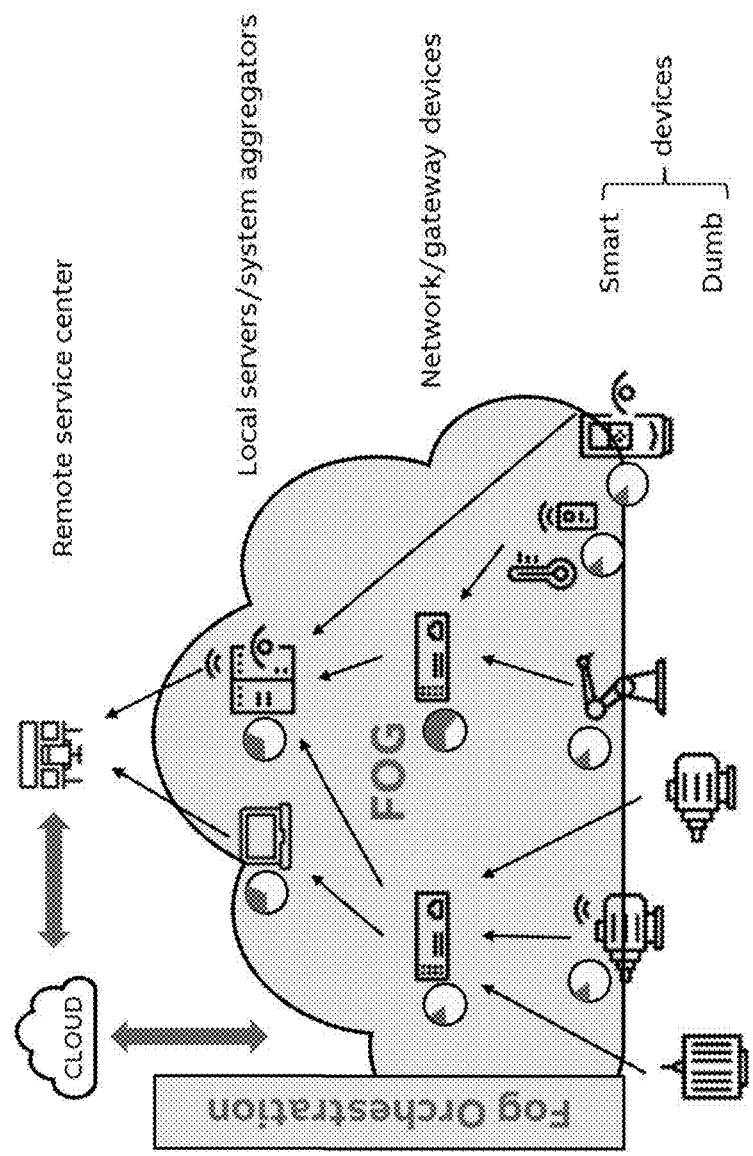
FIG. 1 illustrates an example of an automation system with a plurality of devices. A fog network is hosted by the devices.

FIG. 1 shows an exemplary embodiment of a distributed control system (DCS), or distributed automation system, or simply distributed system, implemented on a plurality of devices. The DCS in FIG. 1 is a fog network. Fog computing is also known as edge computing or fogging. Fog computing facilitates the operation of compute, storage, and networking services between end devices and cloud computing data centers. Some prior art documents describe differences between fog computing and edge computing. However, the present application does not distinguish between the concept of fog computing and edge computing and considers both to be identical at least in the concept of the present invention. Accordingly, any reference to fog computing may be a reference to edge computing, any reference to a fog application may be a reference to an edge application and so on.

The physical system can be an automation system. Any system which interacts with its environment via, for example, sensors or actuators, is considered to be an automation system. Automation systems can comprise a huge number of heterogeneous devices. The devices are sometimes referred as the "things" and the concept of the things being connected with each other and communicating with each other is also referred as the "internet of thinks".

FIG. 1 shows a plurality of devices which can form an automation system. A fog network, an optional remote service center and a cloud is shown. The fog network may be connected to a cloud. The cloud can provide additional computational resource capacities like memory or CPU capacity. The generated data of the devices can be gathered and transferred to the cloud, where it is analyzed. While the cloud offers ease of scalability the approach of pushing more and more computation from the automation systems into the cloud has limits, and may often not be technically feasible or economically. Huge data transfers generate problems with latency thresholds, available bandwidth and delayed real-time reactions of the automation system.

Devices can have computational resource capacities, for example a CPU capacity, a memory capacity, and/or a bandwidth capacity. The resource capacities of some devices are exemplary illustrated in FIG. 1 showing a pie chart corresponding the device, wherein the full resource capacity is the full circle, free resource capacity is the unfilled part of the circle and the resource capacity in use is the filled part of the circle.

Some devices are considered as "smart" devices and some devices are considered as "dumb" devices. Smart devices may host a fog node and/or may provide resource capacities. Some examples for smart devices are industry 4.0 devices, automation machines, robot systems, user interfaces, network devices, routers, switches, gateway devices, servers, and comparable devices. Some devices may not host a fog node or may only have very simple tasks like "read-only" devices or "zero resource capacity" devices. These "dumb" devices, however, can still interact with the fog network although they do not provide resource capacities for other tasks than their primary functions, for example simple sensors, simple actuators or other comparable devices.

FIG. 1 shows a simple example of an automation system or distributed control system (DCS) for illustrative propose with a small number of devices. However, other automation system may include a much higher number of devices. The automation system can be a factory or an industrial site in general including any number of devices. Devices of the automation system may be heterogeneous and may provide different resource capacities.

The fog network comprises a plurality of fog nodes. The fog network in FIG. 1 is a network of fog nodes, which reside on a number of devices anywhere between the field of devices and the cloud. The fog nodes offer the execution environment for the fog runtime and the foglets. The fog runtime is an administrative application configured to validate foglets.

Moreover, the fog network contains the software allocated and executed on the various components to manage the fog network, and to achieve the functionality as described in the following. The fog network can deploy and run potentially distributed fog applications. Based on an application model, it can decide which application part—so called foglet— should be deployed on which fog node. Thereby it allocates application parts (foglets) so as to adhere to given constraints and to optimize one or multiple objectives as per requirements of the application, as further explained below. Furthermore, the fog network can be able to incorporate fog nodes in a cloud, but it shall not depend on a cloud.

Fog nodes are implemented on devices. A device can host one or more fog nodes. If fog applications run on devices that are shared with non-fog applications, the fog applications shall not interfere with those applications (the so-called primary function). Accordingly, a fog node may use a predetermined maximum resource capacity of the hosting device. However, the maximum resource capacity may also be variable in some examples. A fog node may be hosted parallel to the primary functionality of the device. In some embodiments, fog nodes can be hosted on a virtual machine (VM) on the device.

The "fog orchestration" shown in FIG. 1 is a conceptional illustration of basic software components which may be included in the fog network and may run on one or more fog nodes. The software components may include:

A Fog Monitor, which retrieves information on fog nodes and deployed fog applications. The resulting model of the fog network and application allocation may be provided to one or both of the Fog Controller and the Fog Manager;

A Fog Controller including a Fog Allocator, which calculates a mapping of the application's parts (foglets) to fog nodes so that data transfer is minimized. It then deploys the calculated mapping and foglets;

A Fog Manager, which may provide a user interface for selection and configuration of fog applications, allowing a user to deploy/update/remove applications, displays information on fog network and deployed applications. The Fog Manager triggers the according functionality of the Fog Controller upon deploy/update/remove requests by the user.

According to an aspect of the present disclosure, a foglet is a unit of deployment, execution and management in the fog network. Fog applications in general consist of a set of foglets that together form an added value functionality. In other words, a foglet is an application component. A foglet refers to a particular functionality, for example, a module, of an application and how to deploy and execute it, for example, the foglet configuration. Such an application module is the building block for a fog application.

Allocation of foglets may use an allocation algorithm which computes an allocation of foglets to fog nodes based on a concrete application model. The algorithm can for example implement a heuristic or exact linear program solution that targets specific optimization goals, e.g. the minimization of data transfers across network links. Based on models of the application and the fog network onto which the application should be deployed, an allocation algorithm (allocator) computes a mapping of application parts (foglets) to fog nodes. The allocation algorithm thereby can have multiple optimization objectives, for example, it shall minimize the needed network bandwidth, minimize latencies, satisfy network bandwidth constraints and constraints on latencies of data flows, and fulfill specific requirements if indicated in the application model.

Figure 2:
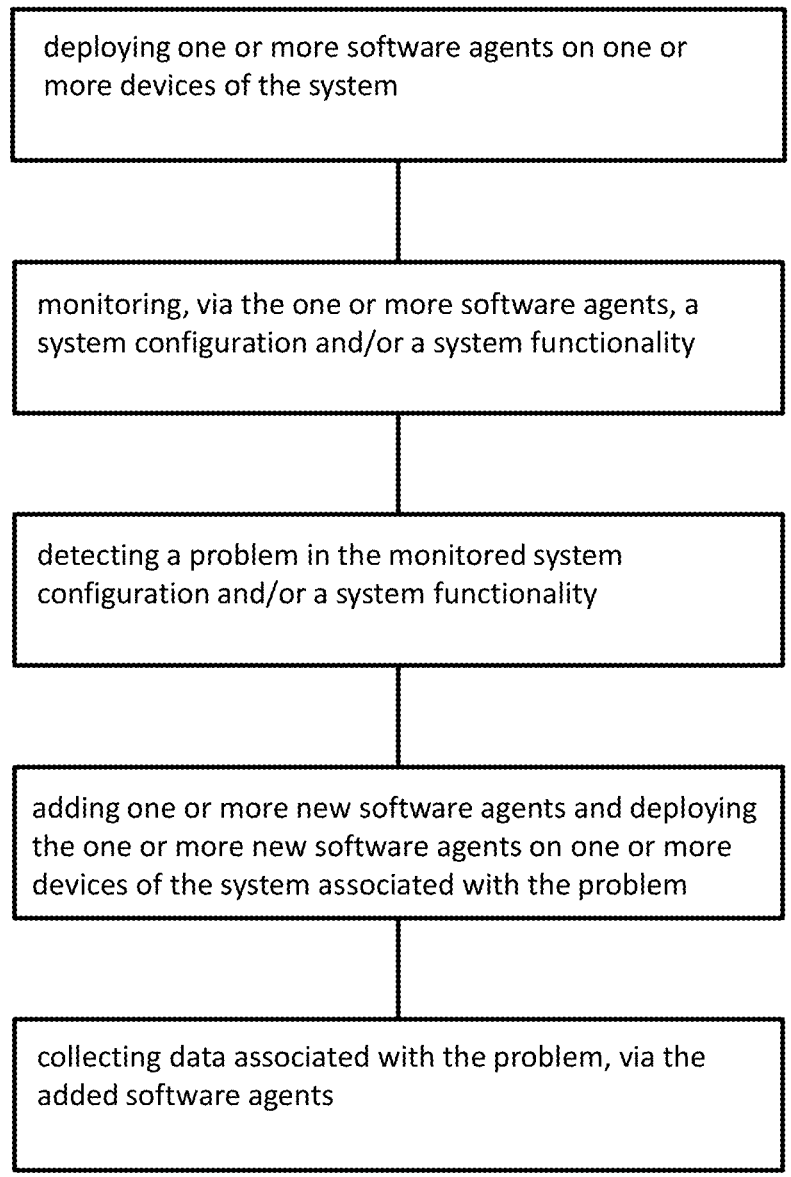
FIG. 2 illustrates an example of a method according to the present disclosure.

According to an aspect of the present disclosure as shown in FIG. 2, a method for detecting system problems in a distributed control system comprising a plurality of computational devices is suggested. The method comprises:—deploying one or more software agents on one or more devices of the system;—monitoring, via the one or more software agents, a system configuration and/or a system functionality;—detecting a problem in the monitored system configuration and/or a system functionality;—adding one or more new software agents and deploying the one or more new software agents on one or more devices of the system associated with the problem;—collecting data associated with the problem, via the added software agents.

In a distributed control system (DCS) devices may join or leave a running system, e.g. when a DCS is equipped with new smart sensors. As a result, it becomes harder to monitor all regions of the system from few pre-selected fixed devices, e.g. gateways and firewalls. This means that it is increasingly difficult to detect system problems, e.g. security breaches and/or simple misconfigurations, which potentially lead to system malfunctioning and/or costly downtimes. The suggested method solves this problem by providing software agents on one or more devices of the system which monitor the system configuration and/or a system functionality.

The present disclosure mitigates such problems by adaptively distributing software agents strategically across the system, which provides the required level of system visibility at all times. In case of a suspected issue (a problem in the monitored system configuration and/or a system functionality) the number of monitoring software agents is dynamically scaled up or down in the affected region based on the current observability needs. For instance, when reconfiguring a part of the system, the agent density can be temporarily increased to detect any misconfigurations in that part of the system. The invention thus enables more dynamic systems at less overall monitoring effort and thus lower cost.

According to an aspect, the monitoring of the system configuration and/or the system functionality includes the monitoring of: a network traffic, an application data, a system performance, or combinations thereof. The group of active software agents constitutes the collaborative and distributed system that processes network traffic, application/network data or system performance data in real-time.

According to an aspect, monitoring of the system is an on-the-fly observation of a running system, specifically in depth or breadth of a running system. Monitoring may be periodically in approximately real-time, for example every second, every two seconds, or every five seconds.

According to an aspect, detecting a problem in the monitored system configuration and/or a system functionality includes:—comparing the monitored system configuration and/or a system functionality against a known or desired system configuration and/or a system functionality. A changed system configuration may result from a change of the topology of the system, e.g., resulting from devices joining and leaving the system. Alarms or events may be logged by comparing the monitored system configuration and/or a system functionality (current state of the system) against a known/desired/expected system model.

Collecting data associated with the problem, via the added software agents, can be the same type of data which was monitored during monitoring of the system configuration and/or a system functionality but in more detail. For example, software agents may monitor the network traffic at a gateway and detect a problem. New software agents may then be sent to the devices connected to the gateway to find out which device behind the gateway has a problem.

The known or desired system configuration and/or a system functionality can also be a defined system configuration and/or a system functionality based on (previous) monitored system configuration and/or system functionality. The method can comprise:—defining a normal system configuration and/or a normal system functionality based on the monitored system configuration and/or system functionality, wherein detecting a problem in the monitored system configuration and/or a system functionality includes:—detecting a problem in the monitored system configuration and/or a system functionality by comparing the monitored system configuration and/or the system functionality with the normal system configuration and/or the normal system functionality.

According to an aspect, the normal system configuration and/or a normal system functionality may be continuously updated based on the monitoring. For example, minor changes of the system configuration and/or system functionality may be considered as "normal" which would lead to an update of the normal system configuration and/or a normal system functionality. Abrupt changes of the system configuration, or continuously decline of functionality may be considered as a "detection of a problem".

Specifically, updating the normal system configuration and/or the normal system functionality may be based on a machine-learning algorithm. The software agents may "learn" the normal system configuration and/or the normal system functionality of the given system based on monitored data during operation or before. Problem detection can also be based on a machine learning algorithm.

In some examples, the problem in the monitored system configuration and/or a system functionality is associated with an addition or a removal of a device to or from the system.

Software agents are software components which are configured to monitor the system configuration and/or the system functionality. Specifically, software agents can be foglets of a "monitoring application" in a fog network. The number of active software agents on devices or fog nodes across the running system may depend on the total number of devices of the system and/or on the desired monitoring density.

In some examples, software agents are provided in a software agent repository and the method may comprise:—providing a software agent repository including a plurality of software agents, wherein deploying one or more software agents on one or more devices of the system includes choosing one or more of the plurality of software agents in the software agent repository and deploying the chosen one or more software agents on one or more devices of the system. Each software agent may be of a type. Types of software agents can be configured to connect to different data sources and run monitoring queries as complex event processing.

According to an aspect, the method may further comprise:—reporting the collected data; and—removing the added software agents. An engineer may use the data to solve the problem manually after he has received the data necessary to identify the exact problem. After the data is collected, the software agents may be removed or may be put to rest.

A software agent may be described as a standardized unit of software that can be stored in a repository referred to as "software agent at rest", or downloaded to a device belonging to the system and executed referred to as "software agent in action".

The group of running software agents is scalable and adaptable to the state/condition of the system. In one mode of operation ("surveillance"), the software agents may perform high-level monitoring with a minimum number of agents and/or reduced agent functionality for reduced overhead. In another mode of operation ("deep inspection"), new agents can be temporarily added (or the existing ones replicated), to investigate problems that may appear in the system requiring increased monitoring to better understand the problem. Once in execution, the software agent consumes a predetermined amount of resources in isolation on the physical device it is assigned to.

According to an aspect, deploying one or more software agents on one or more devices of the system includes:—deploying at least a coordinator software agent configured to create and deploy software agents on one or more devices of the system;—creating and deploying, by the coordinator software agent one or more software agents on one or more devices of the system, wherein the created and deployed software agents are configured to report, to the coordinator software agent, resource requirements of further software agents and/or if a software agent should be terminated.

The coordinator software agent can be configured to terminate software agents on one or more devices of the system, wherein the method further includes:—terminating, by the coordinator software agent, one of the one or more software agents. Specifically, the coordinator software agent manages the lifecycle of software agents and their dispatch or replication thereof to different regions of the system to increase observability in those regions. The method includes a mechanism that allows existing "software agents in action" to communicate to the coordinator software agent the resource needs of new software agents or whether some "software agents in action" should be put back to rest.

The coordinator software itself may be replicated for redundancy and high availability. Accordingly, deploying at least a coordinator software agent configured to create and deploy software agents on one or more devices of the system can include:—deploying a plurality of coordinator software agents each configured to create and deploy software agents on one or more devices of the system.

In some examples, software agents may be fog agents, which is a type of a foglet. A fog network comprising a plurality of fog nodes may be implemented on the system, wherein deploying a software agent on one or more devices of the system includes deploying a software agent (fog agent) on one or more of the fog nodes implemented on the one or more devices.

A system is also suggested, wherein the system comprises a plurality of devices and wherein the system is configured to perform the method as described herein.

The following examples show some embodiments of the present disclosure:

Example 1

In this example, the system contains software agents whose role is to detect anomalies in network traffic while keeping the overhead low by deploying specialized agents only when needed. By default, the software agents are observing and following simple communication patterns, so that the introduced computation overhead by these agents remains low. Once the software agents observe that some communication is not fitting the previously learned pattern, e.g., there is a sudden increase in use of a particular Operation Technology (OT) communication protocol, then there is a need for deeper inspection. To do this a set of software agents at rest, specialized and dedicated for inspecting the particular OT communication protocol, are now awakened and deployed on the devices (or fog nodes) that provide better observability of the problem. The aim is to evaluate if the observed behavior is indeed an intrusion or not. Once the inspection is completed, these software agents are removed from their physical devices and become "fog agents at rest" again.

Example 2

In this example, the system contains software agents whose role is to detect anomalies in network traffic with the goal of detecting and locating intrusions early while keeping the overhead low by tuning the system observability through the number and location of deployed agents. To reduce the overhead, the agents are deployed at the network aggregation points of the system, such as edge routers, to observe all traffic that passes between different parts of the system. By observing the traffic, the agents learn the normal traffic patterns. Once there is an anticipated change in traffic patterns coming from one part of the system, for example there is a sudden surge in traffic that indicate a denial of service attack or a few system nodes are suddenly using new communication protocols, a deeper system inspection is required in order to learn more about the anomaly and to locate a potential intrusion. A set of new software agents is then created or awakened from a rest status and deployed deeper into that part of the system to identify the devices causing the anomaly and to investigate if there was an intrusion or not. Once the investigation is completed, these software agents get removed from physical devices and become "software agents at rest" again or are removed.

Example 3

In example 3, the system is a fog system in a surveillance mode and software agents in the form of network anomaly detection sensor (NADS) agents are placed on the fog nodes so that at least one of the two endpoints of each Ethernet connection is covered. The agents monitor all network traffic at their location and assess periodically, e.g. each second, whether the current system functionality is normal. Whether the situation is normal or not is assessed based on a model of normality, which is either engineered according to the system configuration or learnt by a machine learning method during operation or before, e.g., during commissioning. In surveillance mode, the model of normality is based on simple key performance indicators (KPIs) such as the number of packets per second and the number of distinct source-destination pairs (in Ethernet and IP headers).

If a NADS agent detects an anomaly, it notifies the coordinator software agents. The coordinator software agents in turn initiates the deep inspection mode, i.e., it calculates the set of additional software agents and their locations at which they shall be placed. In particular, at the device or fog node where the anomaly was detected and at each adjacent node, a NADS+ agent and a DADS (device anomaly detection sensor) agent are placed. The NADS+ agents perform a deeper network anomaly detection than the NADS agents, i.e., they inspect more network traffic KPIs and may also do protocol specific deep packet inspections. The DADS inspect the logs available on the devices, e.g. security related syslogs, calculating cs. The NADS+ and the DADS agents report back to the coordinator software agent. The coordinator software agent uses the more detailed information to do a root cause analysis and either issues actions to mitigate the situation (e.g. cutting off a compromised device from the network) and/or to provide a detailed report, which is eventually made available to a human supervisor (via a device HMI, or via e-mail or notification in some dashboard) in order to take appropriate actions.

In a variant of example 3, instead of adding separate NADS+ agents in addition to the NADS agents, the coordinator software agent might be able to reconfigure the NADS agents to upgrade them to NADS+ agents.

Figure 3:
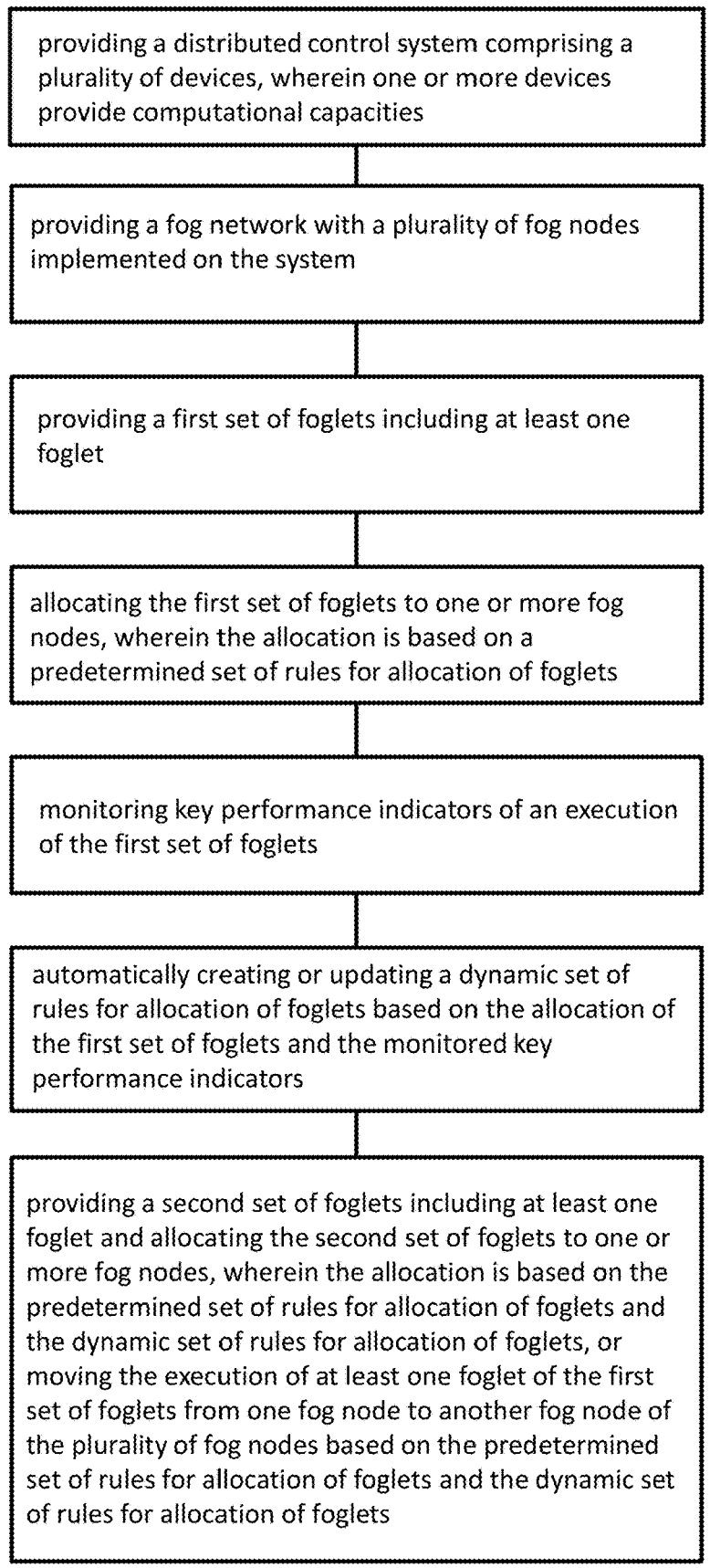
FIG. 3 illustrates an example of a method according to the present disclosure.

According to a further aspect of the present disclosure as shown in FIG. 3, a method for allocating foglets in a fog network is suggested, wherein the fog network is implemented on a distributed control system comprising a plurality of devices. The method comprises:—providing a distributed control system comprising a plurality of devices, wherein one or more devices provide computational capacities;—providing a fog network with a plurality of fog nodes implemented on the system;—providing a first set of foglets including at least one foglet;—allocating the first set of foglets to one or more fog nodes, wherein the allocation is based on a predetermined set of rules for allocation of foglets;—monitoring key performance indicators of an execution of the first set of foglets;—automatically creating or updating a dynamic set of rules for allocation of foglets based on the allocation of the first set of foglets and the monitored key performance indicators;—providing a second set of foglets including at least one foglet and allocating the second set of foglets to one or more fog nodes, wherein the allocation is based on the predetermined set of rules for allocation of foglets and the dynamic set of rules for allocation of foglets, or moving the execution of at least one foglet of the first set of foglets from one fog node to another fog node of the plurality of fog nodes based on the predetermined set of rules for allocation of foglets and the dynamic set of rules for allocation of foglets.

In the prior art, resources (e.g. CPU capacity, memory, storage) of distributed control systems (DCS) are statically allocated to specific functions, regardless of the actual services' (foglets) resource needs. Thus, the performance of some functions may suffer from limited resources, while others might be not using the resources allocated to them at all. The method as disclosed herein solves the problem by introducing two sets of rules on which the allocation of foglets is based.

A predetermined set of rules for allocation of foglets can be provided during system engineering, potentially in combination with a statically defined default allocation. Machine-readable rules definitions can manifest e.g. as a text file via a domain-specific scripting language. Simple examples of rules take care about the minimum required resources for running a specific service (e.g. a control execution service may need a certain amount of memory), or prerequisite from other services (e.g. partial execution).

In some examples, the method further comprises:—monitoring the current resource status of one or more of the fog nodes; wherein the allocation of the first set of foglets is further based on the current resource status of one or more of the fog nodes and wherein the allocating the second set of foglets or the moving of the execution of the first set of foglets is further based on the current resource status of one or more of the fog nodes. Rules of both, the predetermined and the dynamic set of rules for allocation of foglets may include resources availability of the current resource status of the system. Accordingly, the allocator is in that case capable of fetching resource status of one or of each node (e.g. CPU, memory, disk space of nodes). Such information can for instance be provided by the Fog Monitor.

Specifically, the resource status comprises one of: a free CPU capacity, a free memory, or combinations thereof.

Key performance Indicators of the system may be performance data of network traffic or application data. For example, key performance indicators (KPIs) can be the number of packets per second send in a network of any kind or the number of distinct source-destination pairs (in Ethernet and IP headers). Key performance Indicators may also be the time which is needed to execute an application, a set of foglets or a foglet.

The dynamic set of rules is defined and can be updated which enables the Allocation algorithm to recognize changed conditions of the system and to "learn" the best way of allocating foglets in the system. The dynamic set of rules optimizes the load by moving the execution of certain foglets from one node to another (always respecting the given predetermined rules).

According to an aspect, the dynamic set of rules is automatically created or updated based on the monitored key performance indicators of an execution of the first set of foglets by an artificial intelligence algorithm. Specifically, the artificial intelligence algorithm can be a machine learning algorithm. The algorithm can improve the dynamic set of rules over time during runtime of the system.

The second set of foglets is allocated based on the predetermined set of rules for allocation of foglets and the dynamic set of rules for allocation of foglets. The second set of foglets can have one or more foglets of the same type as the first set of foglets.

According to an aspect, the method may be used in a continuously running system. First and second set of foglets may be continuously provided and allocated or re-located based on the predetermined set of rules for allocation of foglets and the dynamic set of rules for allocation of foglets, wherein the key performance indicators of the execution of the foglets are continuously monitored, and wherein the dynamic set of rules is continuously and automatically updated based on the allocation of the first and second set of foglets and the monitored key performance indicators.

A system is also suggested, wherein the system comprises a plurality of devices and wherein the system is configured to perform the method as described herein.

EXAMPLE

Services (foglets) may be ad-hoc in nature, i.e., they shall be allocated and deployed to the system at a given point in time, and removed again, once their task is done. For such services, it is crucial to have a mechanism that can dynamically reconfigure the system in order to make appropriate resources available in the appropriate location of the DCS, for instance by the disclosed mix of predetermined and dynamic rule-based re-allocation of other services.

One example of such an ad-hoc service type is a distributed engineering service. These engineering services in fact may be needed by humans (system engineers) or by other services, e.g. a calculation service may need to know when start up the frequency of the calculations (that could be re-engineered by a central engineering server). A system with the disclosed method could have engineering services containing this information spawned when necessary, deploying the needed information on the nodes where our runtime services runs, and clear those up when not necessary anymore.

The invention claimed is:

1. A method for detecting system problems in a distributed control system including a plurality of computational devices, the method comprising:
deploying one or more software agents on one or more devices of the system;
monitoring, via the one or more software agents, a system configuration and/or a system functionality;
detecting a problem in the monitored system configuration and/or the monitored system functionality;
adding one or more new software agents and deploying the one or more new software agents on one or more devices of the system associated with the problem; and
collecting data associated with the problem, via the added software agents;
wherein deploying one or more software agents on one or more devices of the system includes:
deploying at least a coordinator software agent configured to create and deploy software agents on one or more devices of the system,
creating and deploying, by the coordinator software agent one or more software agents on one or more devices of the system, wherein the created and deployed software agents are configured to report, to the coordinator software agent, resource requirements of further software agents and/or if a software agent should be terminated.

2. The method of claim 1, wherein the monitoring of the system configuration and/or the system functionality includes monitoring: network traffic, application data, system performance, or combinations thereof.

3. The method of claim 2, wherein the detecting a problem in the monitored system configuration and/or the monitored system functionality includes:
comparing the monitored system configuration and/or the monitored system functionality against a known or desired system configuration and/or a known or desired system functionality.

4. The method of claim 2, further comprising:
providing a software agent repository including a plurality of software agents, wherein the deploying one or more software agents on one or more devices of the system includes choosing one or more of the plurality of software agents in the software agent repository and deploying the chosen one or more software agents on the one or more devices of the system.

5. The method of claim 1, further comprising:
defining a normal system configuration and/or a normal system functionality based on the monitored system configuration and/or the monitored system functionality;
wherein the detecting a problem in the monitored system configuration and/or the monitored system functionality includes:
detecting a problem in the monitored system configuration and/or the monitored system functionality by comparing the monitored system configuration and/or the monitored system functionality with the normal system configuration and/or the normal system functionality.

6. The method of claim 1, wherein the coordinator software agent is further configured to terminate software agents on one or more devices of the system, wherein the method further includes:
terminating, by the coordinator software agent, one of the one or more software agents.

7. The method of claim 6, wherein the deploying at least a coordinator software agent configured to create and deploy software agents on one or more devices of the system includes:
deploying a plurality of coordinator software agents each configured to create and deploy software agents on the one or more devices of the system.

8. The method of claim 1, wherein a fog network comprising a plurality of fog nodes is implemented on the system, wherein the deploying one or more software agents on one or more devices of the system includes deploying a software agent on one or more of the fog nodes implemented on the one or more devices.

9. The method of claim 1, wherein the problem in the monitored system configuration and/or the monitored system functionality is associated with an addition or a removal of a device to or from the system.

10. The method of claim 1, wherein the detecting a problem in the monitored system configuration and/or the monitored system functionality includes:
comparing the monitored system configuration and/or the monitored system functionality against a known or desired system configuration and/or a known or desired system functionality.

11. The method of claim 1, further comprising:
providing a software agent repository including a plurality of software agents, wherein the deploying one or more software agents on one or more devices of the system includes choosing one or more of the plurality of software agents in the software agent repository and deploying the chosen one or more software agents on the one or more devices of the system.

12. The method of claim 1, wherein the deploying at least a coordinator software agent configured to create and deploy software agents on one or more devices of the system includes:
deploying a plurality of coordinator software agents each configured to create and deploy software agents on the one or more devices of the system.

* * * * *